United States Patent
Floyd et al.

(10) Patent No.: US 7,574,581 B2
(45) Date of Patent: Aug. 11, 2009

(54) CROSS-CHIP COMMUNICATION MECHANISM IN DISTRIBUTED NODE TOPOLOGY TO ACCESS FREE-RUNNING SCAN REGISTERS IN CLOCK-CONTROLLED COMPONENTS

(75) Inventors: Michael Stephen Floyd, Austin, TX (US); Larry Scott Leitner, Austin, TX (US); Kevin Franklin Reick, Round Rock, TX (US); Kevin Dennis Woodling, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 10/425,397

(22) Filed: Apr. 28, 2003

(65) Prior Publication Data

US 2004/0215929 A1 Oct. 28, 2004

(51) Int. Cl.
*G06F 15/00* (2006.01)
*G06F 15/76* (2006.01)
(52) U.S. Cl. .......................... 712/16; 361/695; 361/683; 361/633; 712/12
(58) Field of Classification Search .................. 712/12, 712/16, 11; 361/683, 633; 370/403; 710/7
See application file for complete search history.

(56) References Cited

U.S. PATENT DOCUMENTS 4,742,511 A * 5/1988 Johnson ...................... 370/406
5,796,995 A * 8/1998 Nasserbakht et al. ........ 713/503

FOREIGN PATENT DOCUMENTS

| JP | 04151754 | 5/1992 |
|---|---|---|
| JP | 06276197 | 9/1994 |
| JP | 10011319 | 1/1998 |

OTHER PUBLICATIONS

Iyer et al., Power and Performance Evaluation of Globally Asynchronous Locally Synchronous Processors, 2002.*
Josephson et al., Test Features of the HP PA71OOLC Processor, 1993.*
Borroso et al, Piranha: A Scalable Architecture Based on Single-Chip Multiprocessing, 2000.*

* cited by examiner

*Primary Examiner*—Niketa I Patel
*Assistant Examiner*—Jesse R Moll
(74) *Attorney, Agent, or Firm*—Matthew W. Baca; Jack V. Musgrove

(57) ABSTRACT

A method of communicating between processing units on different integrated circuit chips in a multi-processor computer system by issuing a command from a source processing unit to a destination processing unit, receiving the command at the destination processing unit while the destination processing unit is processing program instructions, and accessing free-running, scan registers in clock-controlled components of the destination processing unit without interrupting processing of the program instructions by the destination processing unit. The access may be a read from status or mode registers of the destination processing unit, or write to control or mode registers. Many processing units can be interconnected in a ring topology, and the access command can be passed from the source processing unit through several other processing units before reaching the destination processing unit.

7 Claims, 4 Drawing Sheets

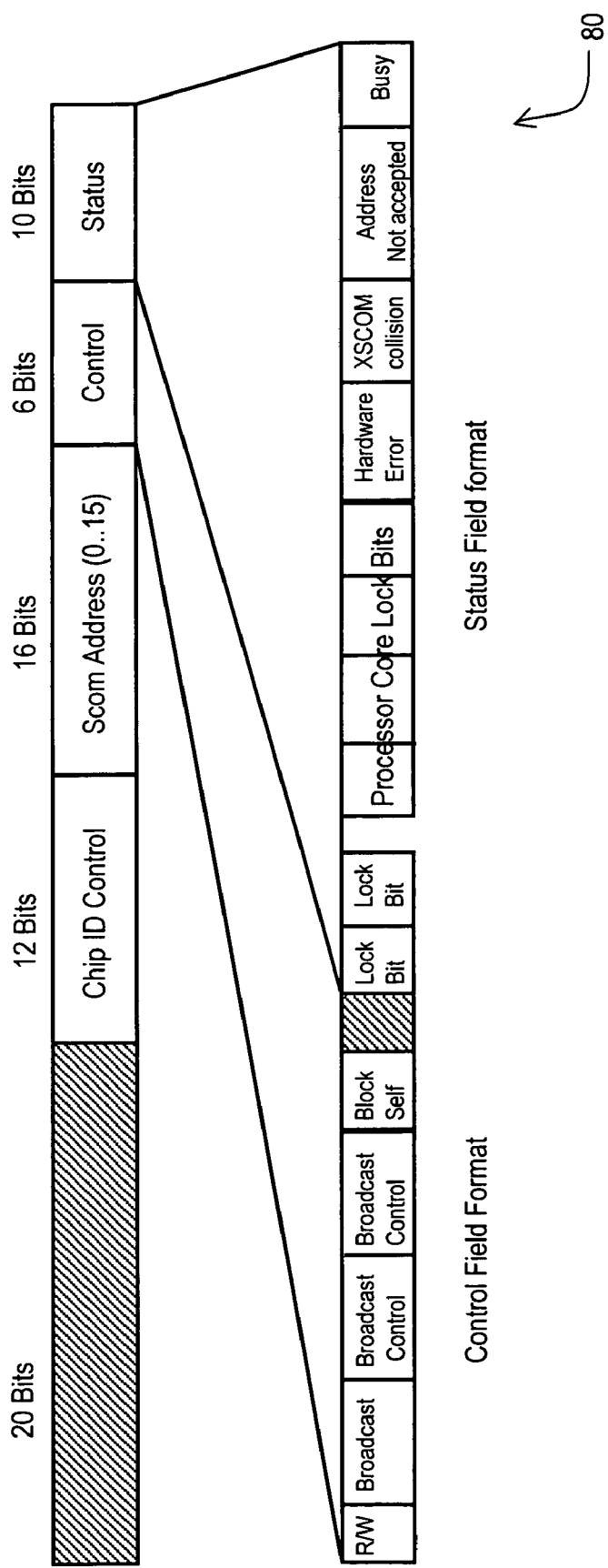

CROSS-CHIP COMMUNICATION MECHANISM IN DISTRIBUTED NODE TOPOLOGY TO ACCESS FREE-RUNNING SCAN REGISTERS IN CLOCK-CONTROLLED COMPONENTS

BACKGROUND OF THE INVENTION

1. Field of the Invention

The present invention generally relates to computer systems, and more particularly to an improved method of handling communications between computer components such as processing units of a multi-processor system which are interconnected in a distributed topology.

2. Description of the Related Art

The basic structure of a conventional symmetric multi-processor computer system 10 is shown in FIG. 1. Computer system 10 has one or more processing units arranged in one or more processor groups; in the depicted system, there are four processing units 12a, 12b, 12c and 12d in processor group 14. The processing units communicate with other components of system 10 via a system or fabric bus 16. Fabric bus 16 is connected to a system memory 20, and various peripheral devices 22. Service processors 18a, 18b are connected to processing units 12 via a JTAG interface or other external service port. A processor bridge 24 can optionally be used to interconnect additional processor groups. System 10 may also include firmware (not shown) which stores the system's basic input/output logic, and seeks out and loads an operating system from one of the peripherals whenever the computer system is first turned on (booted).

System memory 20 (random access memory or RAM) stores program instructions and operand data used by the processing units, in a volatile (temporary) state. Peripherals 22 may be connected to fabric bus 16 via, e.g., a peripheral component interconnect (PCI) local bus using a PCI host bridge. A PCI bridge provides a low latency path through which processing units 12a, 12b, 12c and 12d may access PCI devices mapped anywhere within bus memory or I/O address spaces. PCI host bridge 22 also provides a high bandwidth path to allow the PCI devices to access RAM 20. Such PCI devices may include a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processor core includes the PowerPC™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 26a, 26b includes an on-board (L1) cache (actually, separate instruction cache and data caches) implemented using high speed memory devices. Caches are commonly used to temporarily store values that might be repeatedly accessed by a processor, in order to speed up processing by avoiding the longer step of loading the values from system memory 20. A processing unit can include another cache, i.e., a second level (L2) cache 28 which, along with a memory controller 30, supports both of the L1 caches that are respectively part of cores 26a and 26b. Additional cache levels may be provided, such as an L3 cache 32 which is accessible via fabric bus 16. Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 512 kilobytes, and L3 cache 32 might have a storage capacity of 2 megabytes. To facilitate repair/replacement of defective processing unit components, each processing unit 12a, 12b, 12c, 12d may be constructed in the form of a replaceable circuit board or similar field replaceable unit (FRU), which can be easily swapped installed in or swapped out of system 10 in a modular fashion.

As multi-processor, or multi-chip, computer systems increase in size and complexity, an excess amount of time can be consumed by the overall system in performing various supervisory operations, e.g., initializing each chip at boot time (IPL) or for some other system reset. Most of the supervisory commands that are issued from the service processor to each chip are the same, introducing a degree of redundancy in the procedures that causes a small problem in small systems, but scales to a bigger problem as the system gets bigger. An exemplary state-of-the-art multi-processor system might have four drawers of processing units, with two multi-chip modules (MCMs) in each drawer, and four processing units in each MCM, for a total of 32 processing units. This construction leads to a long boot time as the service processor must sequentially send initialization commands to each of the 32 processing units. The problem can additionally arise with other commands that might be issued after initialization, such as cumulative status checking, or reading fault isolation registers (FIRs).

This problem applies to supervisory routines running on the service processor and also any supervisory routines that might be running on one of the processor cores, since a core cannot directly control other chips in the system without communicating with the service processor, which creates a communications bottleneck. Moreover, this type of usage of the service processor represents a somewhat centralized control structure, and the trend in modern computing is to move away from such centralized control since it presents a single failure point that can cause a system-wide shutdown.

In some prior art multi-processor topologies, data pathways may be provided directly between processing units to allow sharing of memory, but these pathways are inappropriate for handling system-wide commands. The inter-chip data pathways have limited functionality, and are part of the clock-controlled domains of the chips. Accordingly, any attempted use of these pathways for supervisory commands would interrupt operation of the processing units and adversely affect overall system performance.

In light of the foregoing, it would be desirable to devise a communications mechanism for a multi-processor computer system which facilitates transmission of system-level (e.g., supervisory) commands to different chip components such as processor cores and memory subsystems. It would be further advantageous if the mechanism could allow such commands to issue and execute while the processing units are running, that is, without interruption.

SUMMARY OF THE INVENTION

It is therefore one object of the present invention to provide an improved method of communications between chips or processing units in a multi-processor computer system.

It is another object of the present invention to provide such a method which facilitates transmission of system-wide or supervisory-level commands to multiple processing units.

It is yet another object of the present invention to provide a mechanism for cross-chip communications in a distributed node topology which does not exclusively rely on a centralized command structure that might present a communications bottleneck.

The foregoing objects are achieved in a method of communicating between processing units in a multi-processor computer system, generally comprising the steps of issuing a command from a source processing unit to a destination processing unit (wherein the source and destination processing units are physically located on different integrated circuit chips), receiving the command at the destination processing unit while the destination processing unit is processing program instructions, and accessing registers in clock-controlled components of the destination processing unit in response to the command, without interrupting processing of the program instructions by the destination processing unit. The access may take the form of reading data from status or mode registers of the destination processing unit, or writing data to control or mode registers of the destination processing unit. In the illustrative embodiment, there are many processing units interconnected in a ring topology, and the access command can be passed from the source processing unit through several other processing units before reaching the destination processing unit. Each of the processing units is assigned a respective, unique identification number (PID) in addition to one or more optional "special" tags which are not necessarily unique, and the external command interface on a given chip recognizes only those commands that include the corresponding chip tag, unless the command is a broadcast command. Additionally, there is an ability to direct the command to one or more subgroups of processors by implementing subset masks against the PID, selected portion of the PID, or other "special" tag in a broadcast fashion. The external command interface also has the ability to block any broadcast command (e.g., reset) to itself when that command was issued by its associated processing unit (a "Block Self" mode). The processing units are interconnected via a fabric bus, and the external command interface preferably uses an additional communications line that follows the topology of the fabric bus or could alternately use command/data packets across the existing fabric transmission protocol. The service processor has access to this command interface through an external port (e.g. JTAG) and assembly code running on the processing unit has access to the command interface via special assembly code sequences.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

FIG. 5 is a representation of an XSCOM command format in accordance with one implementation of the present invention.

The use of the same reference symbols in different drawings indicates similar or identical items.

DESCRIPTION OF THE PREFERRED EMBODIMENT(S)

Figure 2:
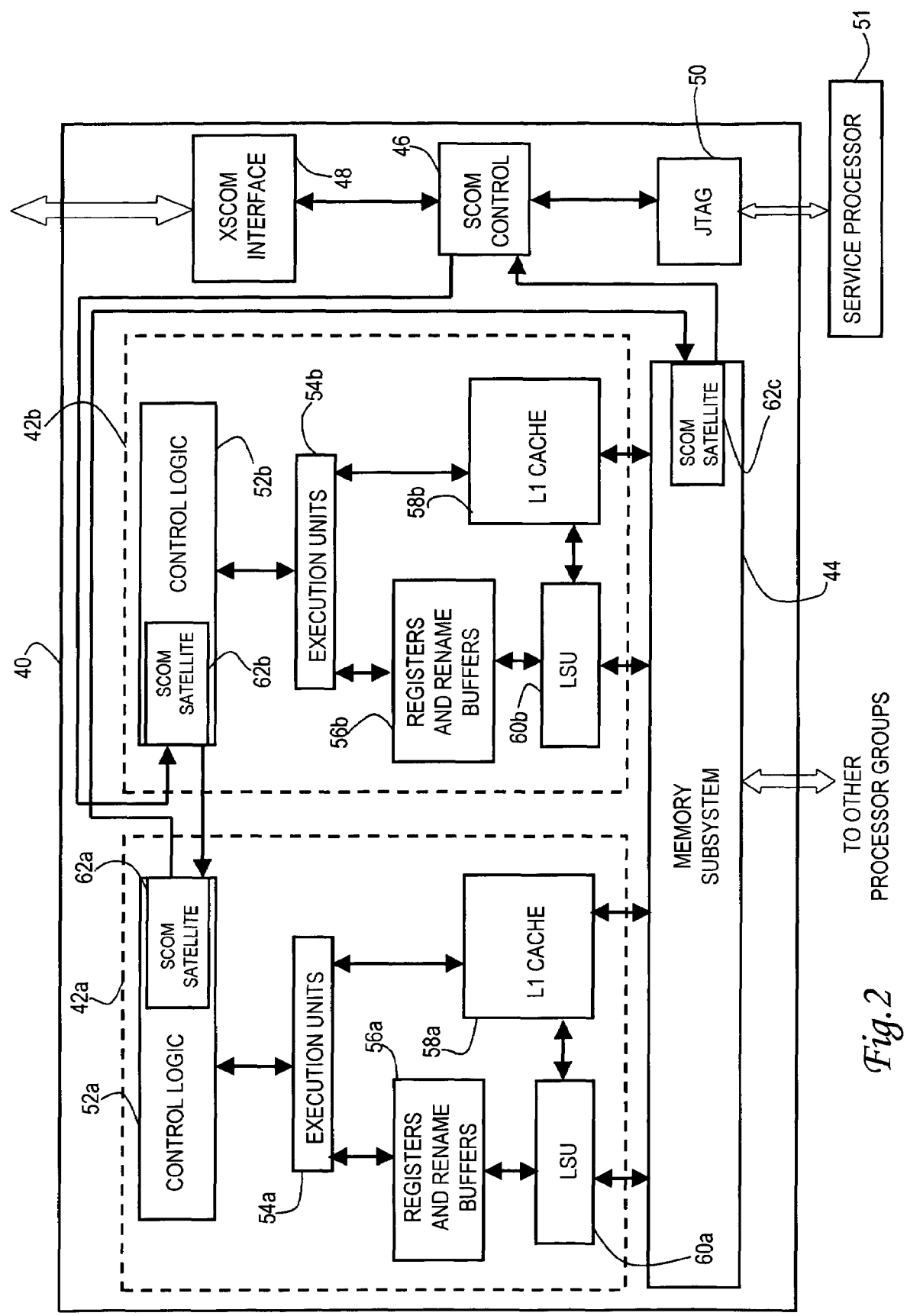
FIG. 2 is a block diagram illustrating one embodiment of a processing unit or chip for a computer system, constructed in accordance with the present invention, and having an external scan communications (XSCOM) interface allowing chip-to-chip communications.

With reference now to the figures, and in particular with reference to FIG. 2, there is depicted one embodiment 40 of a processing unit constructed in accordance with the present invention. Processing unit 40 is preferably constructed as a single integrated-circuit chip, and is generally comprised of two processor cores 42a and 42b, a memory subsystem 44, a scan communication (SCOM) controller 46, an external SCOM (XSCOM) interface 48, and a JTAG interface 50 connected to a service processor 51. Processor cores 42a, 42b and memory subsystem 44 are clock-controlled components, while SCOM controller 46, XSCOM interface 48 and a JTAG, interface 50 are free-running components. Although two processor cores are shown as included on one integrated chip, there could be fewer or more.

Each processor core 42a, 42b has its own control logic 52a, 52b, separate sets of execution units 54a, 54b and registers/buffers 56a, 56b, respective first level (L1) caches 58a, 58b, and load/store units (LSUs) 60a, 60b. Execution units 52a, 52b include various arithmetic units such as fixed-point units and floating-point units, as well as instruction fetch units and instruction sequencer units. Registers 56a, 56b include general-purpose registers, special-purpose registers, and rename buffers. L1 caches 58a, 58b (which are preferably comprised of separate instruction and data caches in each core) and load/store units 60a, 60b communicate with memory subsystem 44 to read/write data from/to the memory hierarchy. Memory subsystem 44 may include a second level (L2) cache and a memory controller.

SCOM controller 46 is connected to various "satellites" located in the clock-controlled components. In the embodiment depicted in FIG. 2, there are three SCOM satellites 62a, 62b, and 62c. SCOM satellites 62a and 62b are respectively located in the control logic 52a, 52b of cores 42a, 42b, while SCOM satellite 62c is located in memory subsystem 44. Only three SCOM satellites are illustrated for simplicity, but those skilled in the art will appreciate that there could be many more satellites located throughout processing unit 40.

SCOM controller 46 allows the service processor to access the SCOM satellites while the components are still running, via JTAG interface 50. The satellites on a given chip are connected in a ring fashion with SCOM controller 46. These SCOM satellites have internal control and error registers (along with mode, status, et al. registers) which can be used to enable and check various functions in the components. Any subset of the registers in any component on the chip may be SCOM-enabled. The chip designer can select whatever configuration might be desirable for the particular application, e.g., fault indicators for a diagnostics routine. In this manner, the service processor can access any chip in the multi-processing system via JTAG interface 50 and access registers while the system is running, without interruption, to set modes, pulse controls, initiate interface alignment procedures, read status of FIRs, etc. SCOM controller 46 carries out these functions by setting an internal command register and an internal data register.

Assembly code running on a component, particularly in the processor cores 42a, 42b, can allow the cores to utilize SCOM features as well. Thus a core can read status bits of another component and control the logic anywhere on its own chip. Using this assembly code and controller 46, a core can further access components on other chips via XSCOM interface 48 (discussed in more detail below). SCOM controller 46 includes appropriate logic to arbitrate between JTAG interface 50 and any assembly code commands from the two processor cores, and the XSCOM interface 48.

JTAG interface 50 provides access between the service processor and SCOM controller 46. JTAG interface 50 complies with the Institute of Electrical and Electronics Engineers (IEEE) standard 1149.1 pertaining to a test access port and boundary-scan architecture. SCOM is an scan communications extension that is allowed by standard 1149.1.

Figure 3:
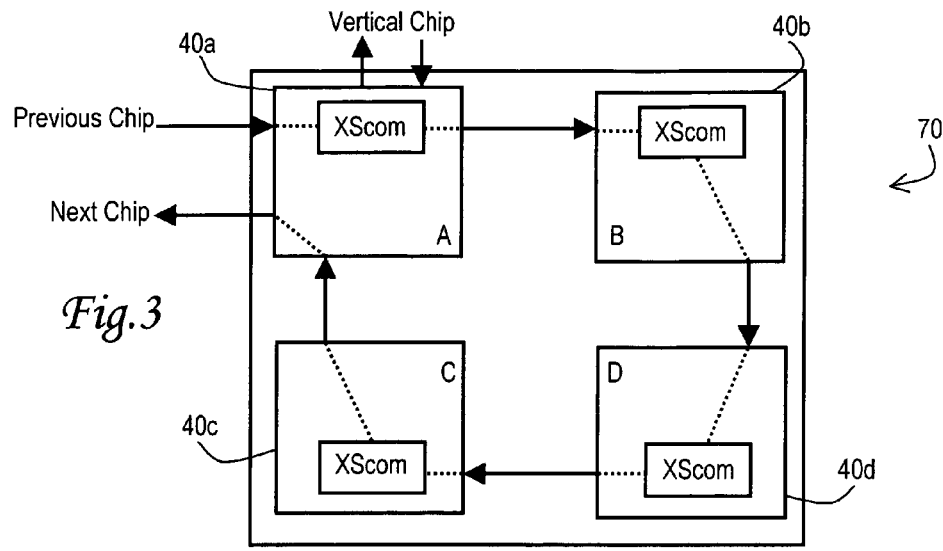
FIG. 3 is a block diagram of a multi-chip module (MCM) utilizing four of the processing units of FIG. 3 which are interconnected in accordance with one implementation of the present invention.

Referring now to FIG. 3, there is depicted one embodiment of a multi-chip module (MCM) 70 constructed in accordance with the present invention. In this embodiment, MCM 70 has four integrated chips 40a, 40b, 40c and 40d (more or less than four could be provided). Each of the four chips 40a, 40b, 40c and 40d is generally identical to processing unit 40 of FIG. 2. In particular, each processing unit 40a, 40b, 40c, 40d includes an XSCOM interface 48 which provides external, chip-to-chip communications without requiring the involvement of the service processor. In this manner, one processor chip (other than the service processor) can control all of the remaining processors in the multi-processor system, i.e., read or set status, mode or control bits in the other processing units without interrupting their operation. Alternately the service processor can access the XSCOM facility on a single processor chip and control all remaining processors in the multi-processor system via a single command. This capability removes the necessity of the service processor for some functions, e.g., a system reset. Such system-level commands can now be broadcast by passing them along to each processing unit 40 in a daisy-chain fashion, rather than replicating the command at the service processor and sending it separately to each processing unit. Additionally, for some commands it removes the need for the service processor to sequentially communicate with each processor chip to perform system-level commands by broadcasting them through a single processor chip.

XSCOM interface 48 utilizes a command register and a data register to carry out the communications (similar to SCOM controller 46). A hardware locking mechanism can be provided to prevent more than one transaction or sequence of related transactions from occurring at a time. Each XSCOM interface is provided with a primary pair of interconnection lines, an input ("Previous Chip") and an output ("Next Chip"). These lines are used to interconnect the four processing units on MCM 70 in a clockwise ring, i.e., the "Next Chip" line on the first chip is connected to the "Previous Chip" line on the second chip, and so on. Only chip 40a is allowed to have off-module interconnections. A secondary pair of interconnection lines for the XSCOM interface may be provided (e.g., "Vertical chip" inputs and outputs) to facilitate intra-drawer communication, depending on the fabric topology. The secondary pair of lines can be selectively enabled.

While each of the processing units 40a, 40b, 40c, 40d in MCM 70 include the structures shown in FIG. 2, certain processing units or subsets of the units may be provided with special capabilities as desired, such as additional ports.

Figure 1:
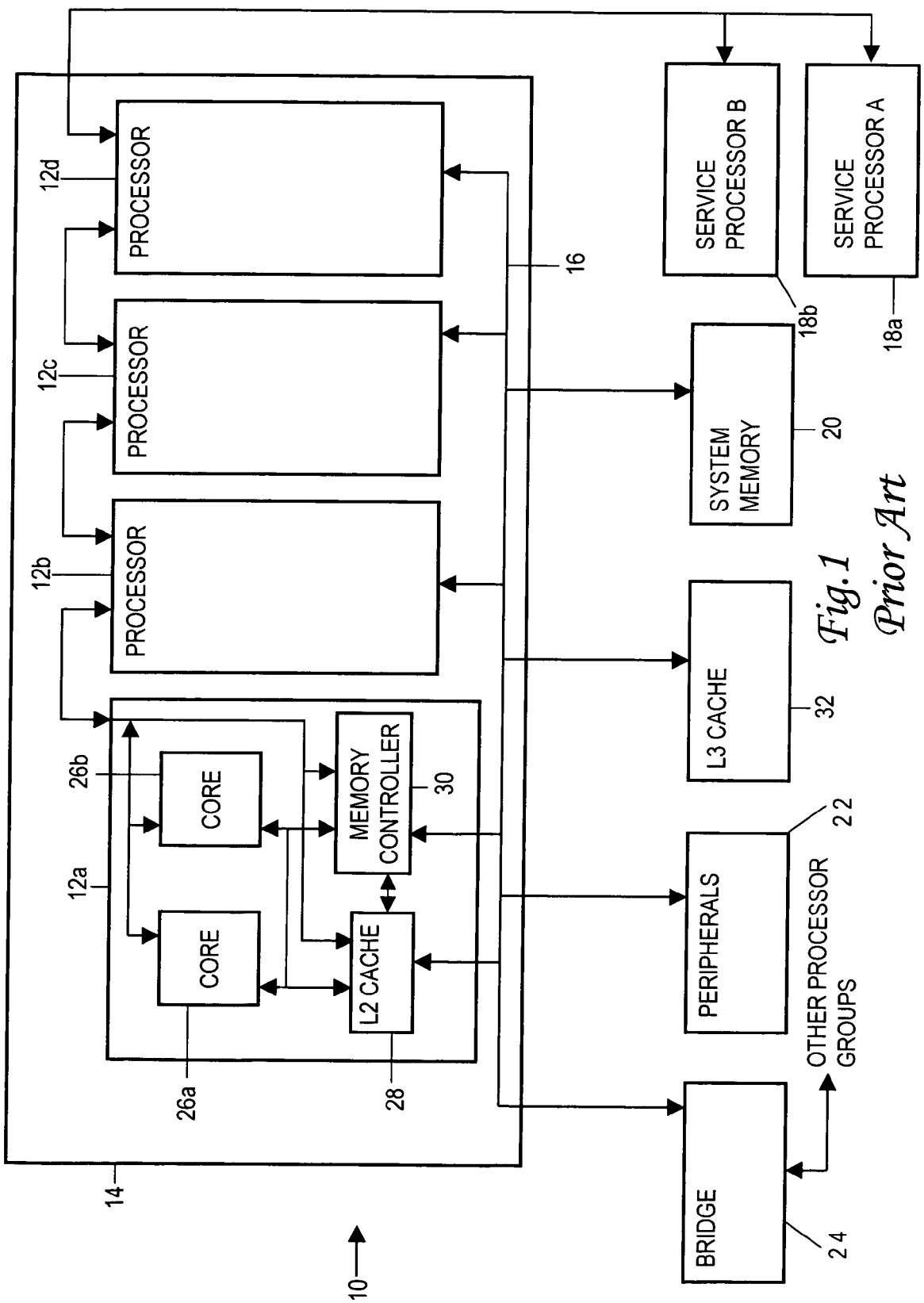
FIG. 1 is a block diagram depicting a conventional symmetric multi-processor (SMP) computer system, with internal details shown for one of the four generally identical processing units.
Figure 4:
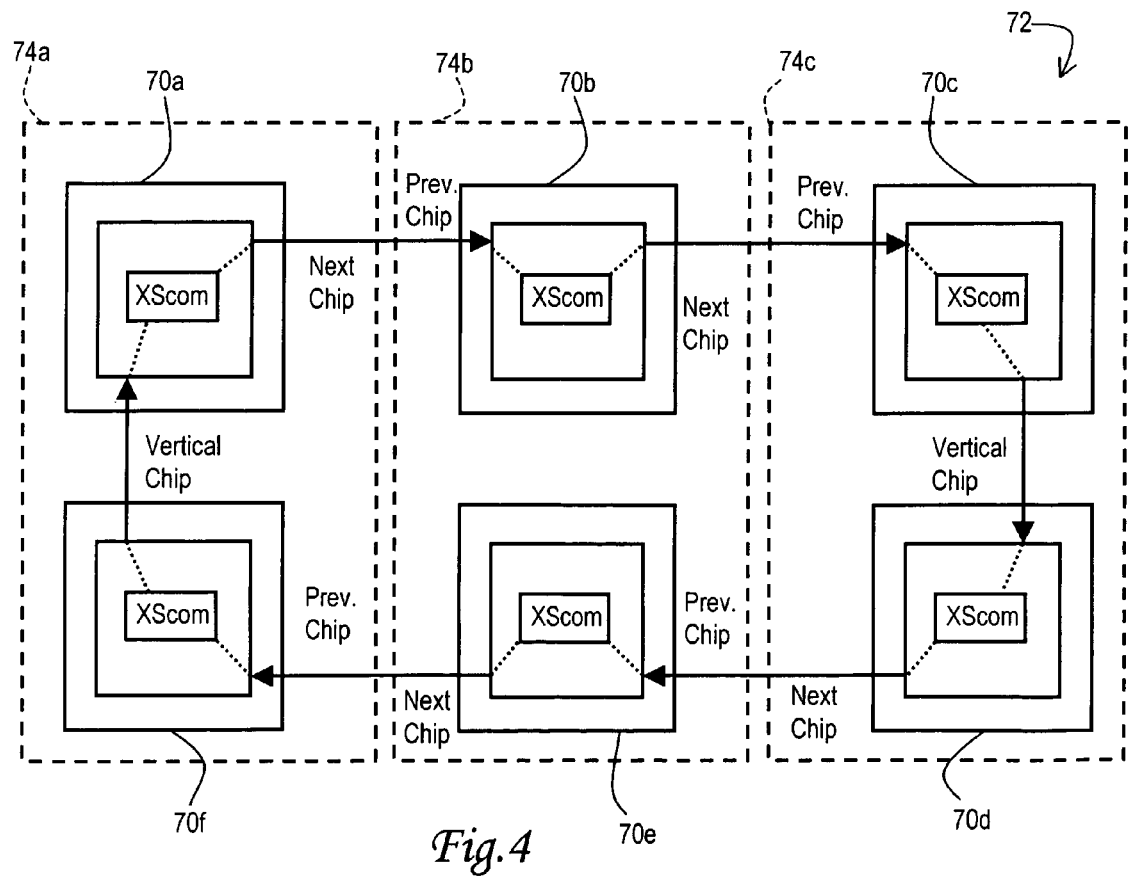
FIG. 4 is a block diagram of a processor group comprising three drawers which each contain two of the MCMs of FIG. 3 and are interconnected in accordance with one implementation of the present invention.

With further reference to FIG. 4, there is a depicted one implementation of a processor group 72 adapted for use with a symmetric multi-processor (SMP) computer system in accordance with the present invention. In this particular implementation, processor group 72 is composed of three drawers 74a, 74b and 74c of processing units. Although only three drawers are shown, the processor group could have fewer or additional drawers. The drawers are mechanically designed to slide into an associated frame for physical installation in the SMP system. Each of the processing unit drawers includes two multi-chip modules, for a total of six MCMs 70a, 70b, 70c, 70d, 70e and 70f (again, the construction could include more than two MCMs per drawer, and the processors could be mounted on processor cards or on a backplane depending on desired application). There are accordingly a total of 24 processing units or chips in processor group 72. Processor group 72 is adapted for use in an SMP system which may include other components such as additional memory hierarchy, a communications fabric and peripherals, as discussed in conjunction with FIG. 1. Each individual chip is preferably manufactured as a field replaceable unit (FRU) so that, if a particular chip becomes defective, it can be swapped out for a new, functional unit without necessitating replacement of other parts in the module or drawer. Alternately, the FRU could be an entire drawer such that if any one component goes bad, the entire drawer is more easily replaced.

One of the MCMs can be designated as the primary module, in this case MCM 70a, and the primary chip 40a of that module is controlled directly by a service processor. The MCMs in processor group 72 further utilize the XSCOM communications protocol for module-to-module communications, in a manner similar to that described for FIG. 3. The "Next Chip" line on the primary chip 40a of a given MCM, such as MCM 70a, is connected to the "Previous Chip" line on the primary chip 40a of the next MCM 72. Some MCMs may utilize a "Vertical Chip" interconnection instead of Previous/Next in order to complete the loop on the end drawers. The MCMs are thus also connected in a clockwise ring or hub topology by the XSCOM interfaces. This topology preferably follows the existing fabric data/command bus topology in wiring.

Each processing unit is assigned a unique identification number (PID) to enable targeting of transmitted data and commands. The XSCOM mode register can then use tags to target XSCOM commands for selected PIDs. Tags can have a portion that represents the topological (physical) location of the processing unit, as well as another portion that represents functional groupings of the processing units. A portion of the PID or separate programmable identifier register can be designated as a "special" tag such that one or more processing units with commonality can share commands in their own grouping. Routines can then form groups based on subsets of PIDs or another separate programmable identifier register. Using these special qualifier tags or group subset masks will cause only certain chips to see the command. Thus, commands could be limited to, e.g., only chips with I/O devices attached, or only primary chips 40*a*, etc. This protocol can further be enhanced to enable a "block self" broadcast mode, wherein the XSCOM command is issued to every processing unit in the system (or group), except for the broadcasting unit itself. This feature might be particularly useful for resetting other chips without resetting the issuing chip.

Additional data pathways could be provided between the chips on a module or in a group. It would be possible to utilize such pathways for system-wide commands by sending XSCOM packets on the existing communications fabric, but the illustrative implementation utilizes an additional line that follows the fabric topology.

In the preferred embodiment, the XSCOM data is simply a 64-bit register. It is the source for outgoing data during an XSCOM write access, and the destination for incoming data after an XSCOM read access. The interpretation of the contents of this register is determined by XSCOM status and control bits that are included in the XSCOM command register. An exemplary format for the XSCOM command register 80 is shown in FIG. 5 and is also 64 bits. In this implementation, the format includes 32 reserved bits xscomc(0:32), which are comprised of 21 unused (spare) bits xscomc (0:19,23), 3 special qualifier bits xscomc(20:22), and a 10-bit chip tag xscomc (24:31). Qualifier bit xscomc(20) controls whether to factor the "special tag" into the chip identification procedure for this command; in this embodiment a special upper portion of the chip tag, i.e., the first two bits of the chip PID on each processing unit, is compared against xscomc(24:25). If qualifier bit xscomc(20) is set to zero, this feature is ignored, but when set to one any broadcast command will match only against these top bits xscomc(24:25). Qualifier bit xscomc(21) controls whether to factor into the chip identification procedure only the module portion of the chip PID. Qualifier bit xscomc(22) controls whether to factor into the chip identification only the drawer portion of the chip tag. The drawer ID is contained in chip tag bits xscomc(27:28), while the module ID is contained in chip tag bit xscomc(29) and the ID for the specific chip on a module is contained in chip tag bits xscomc(30:31). A masking ability may also be provided to allow commands to be sent to certain MCMs or subsets of MCMs, or any other arbitrary grouping that can be formed by binary compares of subsets of PID or special tag fields.

The XSCOM command format also includes a 16-bit SCOM address xscomc(32:47), six control bits xscomc(48:53), and ten status bits xscomc(54:63). The 16-bit SCOM address is used to target a particular SCOM satellite on the destination chip for receiving the command. The first control bit xscomc(48) identifies whether the command is a read request or a write request. Control bits xscomc(49:51) are used in broadcasts, and the first of these bits just flags generally for a broadcast command. The second broadcast control bit xscomc(50) identifies whether the broadcast command is to be accepted by every satellite (this bit is effective only when xscomc(49) is active). The third broadcast control bit xscomc(51) identifies whether the read data is to be OR'd or AND'd by each satellite (this bit is also effective only when broadcast xscomc(49) is active). The fifth control bit xscomc (52) is utilized to implement the "Block Self" broadcast mode wherein a broadcast command is to be executed by each chip except for the originating chip itself. The last control bit xscomc(53) is unused.

As mentioned above, the XSCOM interface contains a hardware locking mechanism to prevent more than one transaction or sequences of related transactions from occurring at a time, since both of the cores on a chip have access to this facility, as does the service processor via the JTAG interface. This locking could be handled through a mailbox or software interface but a hardware mechanism is provided for convenience. The first six status bits xscomc(54:59) can be used as lock bits for this purpose. The first lock bit xscomc(54) identifies a lock placed by the service processor. The second lock bit xscomc(55) is unused. The last four lock bits xscomc(56:59) identify locks places by different threads operating on the processor cores (i.e., core0/thread0, core0/thread1, core1/thread0, and core1/thread1). A given command unit (core or service processor) can obtain a lock by requesting a write for the appropriate lock bit, and thereafter reading that lock bit to see if it has been set. If no other locks were currently set, then the requesting command unit will be able to set its lock bit. After the command is completed, the lock bit is cleared by the originating command unit.

The last four status bits xscomc(60:63) are used to signal conditions which may require a retry of an XSCOM command. A hardware error bit xscomc(60) is set when a hardware error has occurred, such as a timeout or a cyclical redundancy check (CRC) error. An XSCOM collision bit xscomc (61) signals a protocol error arising from conflicting requests. An address not accepted bit xscomc(62) indicates that the target satellite address was not accepted by any satellite on any of the chips within the selected PID group. A busy/disabled bit xscomc(63) is set when the target satellite is unable to currently handle the XSCOM command.

All bits in the XSCOM command register are set to zero during power-on reset.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer system comprising:
   a service processor which issues supervisory commands;
   a first processing unit, separate from said service processor, having
      at least a first processor core,
      a first memory subsystem accessible by said first processor core,
      a first plurality of scan communication satellites having first registers which enable functions of said first processor core and said first memory subsystem, including a first scan communication satellite located in said first processor core and a second scan communication satellite located in said first memory subsystem,
      a first scan communication controller connected in a ring with said first and second scan communication satellites which accesses said first registers without interrupting processing of program instructions by said first processor core,
      a first access port which passes supervisory commands from said service processor to said first scan communication controller, and
      a first external command interface connected to said first scan communication controller which transmits access commands to an output line, wherein said first scan communication controller includes logic which arbitrates between supervisory commands from said first access port, assembly code commands from said first processor core, and access commands from said first external command interface;

a second processing unit, separate from said service processor, having
at least a second processor core,
a second memory subsystem accessible by said second processor core,
a second plurality of scan communication satellites having second registers which enable functions of said second processor core and said second memory subsystem, including a third scan communication satellite located in said second processor core and a fourth scan communication satellite located in said second memory subsystem,
a second scan communication controller connected in a ring with said third and fourth scan communication satellites which accesses said second registers without interrupting processing of program instructions by said second processor core,
a second access port which passes supervisory commands from said service processor to said second scan communication controller, and
a second external command interface connected to said second scan communication controller which receives the access commands at an input line connected to said output line, wherein said second scan communication controller includes logic which arbitrates between supervisory commands from said second access port, assembly code commands from said second processor core, and access commands from said second external command interface; and
a fabric bus connecting said first memory subsystem to said second memory subsystem.

2. The computer system of claim 1 wherein:
said first processing unit is located on a first integrated circuit chip; and
said second processing unit is located on a second integrated circuit chip separate from said first integrated circuit chip.

3. The computer system of claim 1 wherein said first external command interface transmits a command to said second external command interface which corresponds to a supervisory command transmitted from said service processor to said first access port.

4. The computer system of claim 1 wherein the access commands include an address for a particular one of said third and fourth scan communication satellites.

5. The computer system of claim 1 wherein the access commands include a processing unit identification number uniquely associated with said second processing unit.

6. The computer system of claim 1 further comprising additional processing units having respective external command interfaces interconnected in a ring topology with said first and second external command interfaces.

7. The computer system of claim 1 wherein a communications line, separate from said fabric bus, connects said input line to said output line, and follows a topology of said fabric bus.

* * * * *